(12) United States Patent
Mullen et al.

(10) Patent No.: US 10,832,341 B1
(45) Date of Patent: *Nov. 10, 2020

(54) SYSTEM AND METHOD FOR FACILITATING VEHICLE INSURANCE SERVICES

(71) Applicant: STATE FARM MUTUAL AUTOMOBILE INSURANCE COMPANY, Bloomington, IL (US)

(72) Inventors: Christina P. Mullen, Normal, IL (US); William J. Leise, Normal, IL (US); Douglas A. Graff, Mountain View, MO (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/940,264

(22) Filed: Mar. 29, 2018

Related U.S. Application Data

(63) Continuation of application No. 14/841,200, filed on Aug. 31, 2015, now Pat. No. 9,996,885, which is a continuation-in-part of application No. 14/635,043, filed on Mar. 2, 2015, now Pat. No. 9,466,085, which is a continuation of application No. 14/335,501, filed on Jul. 18, 2014, now Pat. No. 8,977,425, which is a
(Continued)

(51) Int. Cl.
*G06Q 40/08* (2012.01)

(52) U.S. Cl.
CPC .................. *G06Q 40/08* (2013.01)

(58) Field of Classification Search
CPC ........... G06F 13/00; G06F 13/14; G06F 17/00
See application file for complete search history.

(56) References Cited

U.S. PATENT DOCUMENTS 3,810,313 A 5/1974 Hicks
4,507,872 A 4/1985 Schermann
(Continued)

FOREIGN PATENT DOCUMENTS

WO WO-2005/043343 A2 5/2005

OTHER PUBLICATIONS

Allstate, "Auto Insurance Ballpark Estimate & Online Insurance Quote," (2014). Retrieved from the Internet: <URL:http://www.allstate.com/auto-insurance/quick-auto-insurance-quote.aspx>.
(Continued)

*Primary Examiner* — Anne Marie Antonucci
(74) *Attorney, Agent, or Firm* — Marshall, Gerstein & Borun LLP

(57) ABSTRACT

A system and method to facilitate providing vehicle insurance services includes providing a specialty vehicle data identifier template for facilitating translation of a vehicle data identifier used to identify a vehicle, the specialty vehicle data identifier template including a plurality of segments, each segment of the plurality of segments representative of a vehicle attribute; receiving a request of a database for vehicle attribute data based on a search term, identifying each vehicle data identifier stored in the database including vehicle attribute data that substantially matches at least a portion the search term, compiling an output including any identified vehicle data identifier, and providing the output in an accessible format in response to the request for information.

18 Claims, 3 Drawing Sheets

Related U.S. Application Data continuation of application No. 14/085,487, filed on Nov. 20, 2013, now Pat. No. 8,972,100.

(60) Provisional application No. 61/798,949, filed on Mar. 15, 2013.

(56) References Cited

U.S. PATENT DOCUMENTS

| | | |
|---|---|---|
| 4,825,679 A | 5/1989 | Cortinovis |
| 5,128,859 A | 7/1992 | Carbone et al. |
| 5,317,503 A | 5/1994 | Inoue |
| 5,432,904 A | 7/1995 | Wong |
| 5,839,112 A | 11/1998 | Schreitmueller et al. |
| 5,950,169 A | 9/1999 | Borghesi et al. |
| 6,052,631 A | 4/2000 | Busch et al. |
| 6,470,303 B2 | 10/2002 | Kidd et al. |
| 6,539,175 B1 | 3/2003 | Geary et al. |
| 6,885,981 B2 | 4/2005 | Bomar, Jr. et al. |
| 7,324,951 B2 | 1/2008 | Renwick et al. |
| 7,502,772 B2 | 3/2009 | Kidd et al. |
| 7,596,512 B1 | 9/2009 | Raines et al. |
| 7,636,676 B1 | 12/2009 | Wolery et al. |
| 8,200,513 B2 | 6/2012 | Vahidi et al. |
| 8,265,963 B1 | 9/2012 | Hanson et al. |
| 8,311,856 B1 | 11/2012 | Hanson et al. |
| 8,364,505 B1 | 1/2013 | Kane et al. |
| 8,712,803 B1 | 4/2014 | Buentello |
| 8,755,779 B1 | 6/2014 | Burks et al. |
| 8,788,301 B1 | 7/2014 | Marlow et al. |
| 8,799,034 B1 | 8/2014 | Brandmaier et al. |
| 8,891,435 B2 | 11/2014 | Zhang et al. |
| 8,972,100 B2 | 3/2015 | Mullen et al. |
| 8,977,425 B1 | 3/2015 | Mullen et al. |
| 9,019,092 B1 | 4/2015 | Brandmaier et al. |
| 9,466,085 B2 | 10/2016 | Mullen et al. |
| 9,508,200 B1 | 11/2016 | Mullen et al. |
| 9,607,339 B1 | 3/2017 | Mullen et al. |
| 9,858,622 B1 | 1/2018 | Mullen et al. |
| 9,996,885 B1 | 6/2018 | Mullen et al. |
| 2002/0055861 A1 | 5/2002 | King et al. |
| 2002/0103622 A1 | 8/2002 | Burge |
| 2002/0161533 A1 | 10/2002 | Uegaki |
| 2002/0188479 A1 | 12/2002 | Renwick et al. |
| 2003/0009270 A1 | 1/2003 | Breed |
| 2003/0111525 A1 | 6/2003 | Sweeney et al. |
| 2003/0233254 A1 | 12/2003 | Hamilton et al. |
| 2004/0044549 A1 | 3/2004 | Loop |
| 2004/0083041 A1 | 4/2004 | Skeen et al. |
| 2004/0117081 A1 | 6/2004 | Mori |
| 2004/0148188 A1 | 7/2004 | Uegaki |
| 2004/0153356 A1 | 8/2004 | Lockwood et al. |
| 2004/0233077 A1 | 11/2004 | Mizusawa |
| 2005/0075767 A1 | 4/2005 | Dasti et al. |
| 2005/0108065 A1 | 5/2005 | Dorfstatter |
| 2005/0125261 A1 | 6/2005 | Adegan |
| 2006/0195384 A1 | 8/2006 | Bauer et al. |
| 2008/0046261 A1 | 2/2008 | Cunningham |
| 2008/0183600 A1 | 7/2008 | Bowser et al. |
| 2008/0243556 A1 | 10/2008 | Hogan et al. |
| 2008/0255887 A1 | 10/2008 | Gruter |
| 2008/0306996 A1 | 12/2008 | McClellan et al. |
| 2009/0018859 A1 | 1/2009 | Purifoy et al. |
| 2009/0043601 A1 | 2/2009 | Schuh et al. |
| 2009/0051510 A1 | 2/2009 | Follmer et al. |
| 2009/0062978 A1 | 3/2009 | Picard |
| 2009/0300065 A1 | 12/2009 | Birchall |
| 2010/0138242 A1 | 6/2010 | Ferrick et al. |
| 2010/0198637 A1 | 8/2010 | Jenkins et al. |
| 2011/0010276 A1 | 1/2011 | Bowser et al. |
| 2011/0058048 A1 | 3/2011 | Elazar et al. |
| 2011/0087505 A1 | 4/2011 | Terlep |
| 2011/0313936 A1 | 12/2011 | Sieger |
| 2011/0313951 A1 | 12/2011 | Cook |
| 2012/0083959 A1 | 4/2012 | Dolgov et al. |
| 2012/0136802 A1 | 5/2012 | McQuade et al. |
| 2012/0185399 A1 | 7/2012 | Draper |
| 2012/0265563 A1 | 10/2012 | Kwasny |
| 2012/0297337 A1 | 11/2012 | St. Denis et al. |
| 2013/0218761 A1 | 8/2013 | Kwasny |
| 2014/0081876 A1 | 3/2014 | Schulz |
| 2014/0229207 A1 | 8/2014 | Swamy et al. |
| 2014/0278571 A1 | 9/2014 | Mullen et al. |
| 2014/0278572 A1 | 9/2014 | Mullen et al. |
| 2014/0279169 A1 | 9/2014 | Leos |
| 2014/0310186 A1 | 10/2014 | Ricci |
| 2015/0019447 A1 | 1/2015 | Baughman et al. |
| 2015/0066781 A1 | 3/2015 | Johnson et al. |
| 2015/0178852 A1 | 6/2015 | Mullen et al. |

OTHER PUBLICATIONS

Glennon, Automobile crash event data recorder downloading, CrashForensics.com, archived Aug. 10, 2009, available at: http://www.crashforensics.com/automobiledatarecorders.cfm (accessed Dec. 12, 2015).

Glennon, Crash investigation and reconstruction references, CrashForensics.com, archived Oct. 27, 2010, available at http://www.crashforensics.com/papers.cfm?PaperID=20 (accessed Dec. 12, 2015).

GOOGLE.com, search results for the string "Auto Repair Quote" (2014).

LKQonline.com webpage, available at <http://www.lkqonline.com/custom/content/recycledautoparts.htm> (visited on Feb. 19, 2014; archived on Sep. 1, 2009.

State Farm, "Insurance Rate Quote," (2014). Retrieved from the Internet: <URL:https://www.statefarm.com/insurance/quotes>.

U.S. Appl. No. 14/085,487, "System and Method for Facilitating Transportation of a Vehicle Involved in a Crash," filed Nov. 20, 2013.

U.S. Appl. No. 14/085,487, Corrected Notice of Allowability, dated Dec. 15, 2014.

U.S. Appl. No. 14/085,487, Corrected Notice of Allowability, dated Jan. 30, 2015.

U.S. Appl. No. 14/085,487, Corrected Notice of Allowability, dated Oct. 31, 2014.

U.S. Appl. No. 14/085,487, Nonfinal Office Action, dated Feb. 12, 2014.

U.S. Appl. No. 14/085,487, Notice of Allowance, dated Jun. 17, 2014.

U.S. Appl. No. 14/085,497 Office Action, dated Jun. 22, 2017.

U.S. Appl. No. 14/085,497, "System and Method for Treating a Damaged Vehicle," filed Nov. 20, 2013.

U.S. Appl. No. 14/085,497, Final Office Action, dated Apr. 19, 2016.

U.S. Appl. No. 14/085,497, Final Office Action, dated Dec. 24, 2014.

U.S. Appl. No. 14/085,497, Final Office Action, dated Feb. 14, 2017.

U.S. Appl. No. 14/085,497, Final Office Action, dated Jul. 16, 2015.

U.S. Appl. No. 14/085,497, Final Office Action, dated Oct. 16, 2017.

U.S. Appl. No. 14/085,497, Nonfinal Office Action, dated Dec. 22, 2015.

U.S. Appl. No. 14/085,497, Nonfinal Office Action, dated Apr. 2, 2018.

U.S. Appl. No. 14/085,497, Nonfinal Office Action, dated Apr. 8, 2015.

U.S. Appl. No. 14/085,497, Nonfinal Office Action, dated Feb. 27, 2014.

U.S. Appl. No. 14/085,497, Nonfinal Office Action, dated Oct. 17, 2016.

U.S. Appl. No. 14/085,497, Nonfinal Office Action, dated Sep. 10, 2014.

U.S. Appl. No. 14/085,512, "System and Method for Routing a Vehicle Damaged in a Crash," filed Nov. 20, 2013.

U.S. Appl. No. 14/085,512, Final Office Action, dated Apr. 20, 2018.

U.S. Appl. No. 14/085,512, Final Office Action, dated Apr. 21, 2016.

U.S. Appl. No. 14/085,512, Final Office Action, dated Jul. 16, 2015.

U.S. Appl. No. 14/085,512, Final Office Action, dated Nov. 28, 2014.

(56) References Cited

OTHER PUBLICATIONS

U.S. Appl. No. 14/085,512, Final Office Action, dated Oct. 20, 2016.
U.S. Appl. No. 14/085,512, Final Office Action, dated Jul. 24, 2017.
U.S. Appl. No. 14/085,512, Non-Final Office Action, dated Nov. 13, 2017.
U.S. Appl. No. 14/085,512, Nonfinal Office Action, dated Feb. 28, 2014.
U.S. Appl. No. 14/085,512, Nonfinal Office Action, dated Jul. 18, 2014.
U.S. Appl. No. 14/085,512, Nonfinal Office Action, dated Mar. 25, 2015.
U.S. Appl. No. 14/085,512, Nonfinal Office Action, dated Dec. 21, 2015.
U.S. Appl. No. 14/085,512, Nonfinal Office Action, dated Mar. 13, 2017.
U.S. Appl. No. 14/335,501, Notice of Allowance, dated Jan. 2, 2015.
U.S. Appl. No. 14/335,501, Notice of Allowance, dated Jan. 28, 2015.
U.S. Appl. No. 14/335,501, Notice of Allowance, dated Nov. 21, 2014.
U.S. Appl. No. 14/335,501, Notice of Allowance, dated Sep. 11, 2014.
U.S. Appl. No. 14/635,043, Final Office Action, dated Sep. 1, 2015.
U.S. Appl. No. 14/635,043, Nonfinal Office Action, dated Apr. 7, 2015.
U.S. Appl. No. 14/635,043, Notice of Allowance, dated Jun. 29, 2016.
U.S. Appl. No. 14/635,043, Notice of Allowance, dated Nov. 25, 2015.
U.S. Appl. No. 14/635,043, Notice of Allowance, dated Mar. 3, 2016.
U.S. Appl. No. 14/841,179, Final Office Action, dated May 3, 2017.
U.S. Appl. No. 14/841,179, Final Office Action, dated Sep. 2, 2016.
U.S. Appl. No. 14/841,179, Non-Final Office Action, dated Dec. 30, 2016.
U.S. Appl. No. 14/841,179, Nonfinal Office Action, dated Apr. 27, 2016.
U.S. Appl. No. 14/841,179, Notice of Allowance, dated Aug. 11, 2017.
U.S. Appl. No. 14/841,179, Notice of Allowance, dated Nov. 27, 2017.
U.S. Appl. No. 14/841,200, Final Office Action, dated Sep. 6, 2016.
U.S. Appl. No. 14/841,200, Final Office Action, dated May 4, 2017.
U.S. Appl. No. 14/841,200, Non-Final Office Action, dated Aug. 22, 2017.
U.S. Appl. No. 14/841,200, Non-Final Office Action, dated Dec. 29, 2016.
U.S. Appl. No. 14/841,200, Nonfinal Office Action, dated Apr. 27, 2016.
U.S. Appl. No. 14/841,200, Notices of Allowance, dated Mar. 1, 2018 and Feb. 14, 2018.
U.S. Appl. No. 14/841,222, Final Office Action, dated Apr. 6, 2016.
U.S. Appl. No. 14/841,222, Nonfinal Office Action, dated Apr. 6, 2016.
U.S. Appl. No. 14/841,222, Nonfinal Office Action, dated Nov. 2, 2015.
U.S. Appl. No. 14/841,222, Notice of Allowance, dated Jul. 28, 2016.
U.S. Appl. No. 15/010,895, Final Office Action, dated Aug. 5, 2016.
U.S. Appl. No. 15/010,895, Nonfinal Office Action, dated Mar. 23, 2016.
U.S. Appl. No. 15/010,895, Notice of Allowance, dated Nov. 17, 2016.
U.S. Appl. No. 15/337,809, Final Office Action, dated May 3, 2018.
U.S. Appl. No. 15/337,809, Final Office Action, dated Aug. 14, 2017.
U.S. Appl. No. 15/337,809, Final Office Action, dated Feb. 7, 2017.
U.S. Appl. No. 15/337,809, Non-Final Office Action, dated Dec. 12, 2017.
U.S. Appl. No. 15/417,878, Final Office Action, dated Oct. 19, 2017.
U.S. Appl. No. 15/417,878, Nonfinal Office Action, dated Apr. 4, 2018.
U.S. Appl. No. 15/417,878, Nonfinal Office Action, dated May 4, 2017.
U.S. Appl. No. 15/799,460, Mullen et al., "System and Method for Facilitating Vehicle Insurance Services", filed Oct. 31, 2017.
U.S. Appl. No. 14/085,497, Final Office Action, dated Sep. 21, 2018.
U.S. Appl. No. 15/337,809, Non-Final Office Action, dated Sep. 5, 2018.
U.S. Appl. No. 15/417,878, Final Office Action, dated Sep. 27, 2018.
U.S. Appl. No. 15/417,878, Non-Final Office Action, dated Jan. 25, 2019.
U.S. Appl. No. 15/799,460, Non-Final Office Action, dated Dec. 11, 2018.

SYSTEM AND METHOD FOR FACILITATING VEHICLE INSURANCE SERVICES

CROSS-REFERENCE TO RELATED APPLICATIONS

This application is a continuation of U.S. patent application Ser. No. 14/841,200, filed Aug. 31, 2015, which is a continuation-in-part application of U.S. patent application Ser. No. 14/635,043, filed Mar. 2, 2015 (now U.S. Pat. No. 9,466,085); which is a continuation application of U.S. patent application Ser. No. 14/335,501, filed Jul. 18, 2014 (now U.S. Pat. No. 8,977,425); which is a continuation application of U.S. patent application Ser. No. 14/085,487, filed Nov. 20, 2013 (now U.S. Pat. No. 8,972,100); which claims benefit to the filing date of U.S. Provisional Patent Application 61/798,949, filed Mar. 15, 2013; and the contents of each of these applications are expressly incorporated herein by reference. This application is also related to pending U.S. patent application Ser. No. 14/085,497, "System And Method For Treating A Damaged Vehicle," filed Nov. 20, 2013; and Ser. No. 14/085,512, "System And Method For Routing A Vehicle Damaged In A Crash," filed Nov. 20, 2013; and the contents of each of these patent applications are expressly incorporated herein by reference.

U.S. patent application Ser. No. 14/841,222 (now U.S. Pat. No. 9,508,200), entitled "SYSTEM AND METHOD FOR USING A SPECIALTY VEHICLE DATA IDENTIFIER TO FACILITATE TREATMENT OF A VEHICLE DAMAGED IN A CRASH" and filed concurrently herewith, the entire disclosure of which are hereby expressly incorporated by reference.

U.S. patent application No. 14,841,179 (now U.S. Pat. No. 9,858,622), entitled "SYSTEM AND METHOD FOR FACILITATING VEHICLE INSURANCE SERVICES" and filed concurrently herewith, the entire disclosure of which are hereby expressly incorporated by reference.

TECHNICAL FIELD

The present disclosure generally relates to a system and a method of using a specialty vehicle data identifier to facilitate providing vehicle insurance services, and, more particularly to providing a casualty insurance entity with access to vehicle information maintained in a memory.

BACKGROUND

Millions of manned and unmanned vehicles are used throughout the world every day. The vehicles may be powered or unpowered (e.g., transported or towed by another vehicle) and are commonly used to transport people and cargo that range in size from a single occupant operator to multiple occupant passengers and freight. These vehicles also include a wide range of types, including motorcycles, automobiles, busses, trucks, trains, bicycles, aircraft, and watercraft. To protect a vehicle against the risk of a loss resulting from theft, collision, accident, or other event, a vehicle owner may purchase an insurance policy for the vehicle from a vehicle insurance provider. The insurance policy outlines the conditions and circumstances under which the insured vehicle owner will be financially compensated should the insured vehicle suffer a loss.

Providing for vehicle insurance coverage is a sophisticated technical process that involves many disciplines, including actuarial science, marketing, finance, and government regulation to name but a few. Intricately connected with these disciplines is the vast amount of available information associated with vehicles. For example, each vehicle typically includes a vehicle manufacturer's coded vehicle identification number (VIN and/or VIN number), which when fully decoded, identifies a unique vehicle. The VIN number includes various sections or segments that may be standardized depending where the VIN number is being used, e.g., U.S.A., European Union. Segments of the VIN number may be associated with the vehicle manufacturer identifier, vehicle type identifier, and vehicle serial number. A VIN number with fully populated segments identifies a unique vehicle, while an incomplete or semi-populated VIN number may generally pertain to a group, type, make, model, trim level, class, etc., of vehicle.

Enormous amounts of other information associated with vehicles is also attainable from various resources, for example, collision statistics, marketing statistics, vehicle demographics, governmental vehicle statistics, vehicle recall alerts, vehicle owner information, consumer information research, academic journals, blog, and researcher publications. By effectively accumulating, maintaining, and coordinating the use of a seemingly endless amount of vehicle information, a vehicle insurance provider may enhance many of the services it provides to insured vehicle owners.

SUMMARY

Example systems and methods for facilitating vehicle insurance services provided by a casualty insurance provider are herein described. In accordance with a first example aspect of the invention, a method implemented with a computer system for facilitating vehicle insurance services provided by a casualty insurance provider includes providing a specialty vehicle data identifier template for facilitating translation of a specialty vehicle data identifier used to identify a vehicle. The specialty vehicle data identifier is a coded descriptor for identifying a vehicle and may be configured to include one or more segments of coded representations of vehicle attributes associated with any desired type or category of information that a user may find useful in providing vehicle insurance services. A fully populated specialty vehicle data identifier may correspond to a unique vehicle and a partially populated specialty vehicle data identifier may correspond to a group of vehicles having at least one vehicle attribute in common. The method further includes receiving, by one or more processors of the computer system, a request of a memory for vehicle attribute data based on a search term, the vehicle attribute data associated with one or more segments of the specialty vehicle data identifier template; identifying, by the one or more processors, each specialty vehicle data identifier stored in the database including vehicle attribute data that substantially matches at least a portion the search term; compiling, by the one or more processors, an output including any specialty identified vehicle data identifier; and providing, by the one or more processors, the output in an accessible format in response to the request for information.

A second example aspect of the invention is directed to a system for facilitating vehicle insurance services provided by a casualty insurance provider. The system includes a specialty vehicle data identifier template for facilitating translation of a vehicle data identifier used to identify a vehicle. The specialty vehicle data identifier template including a plurality of segments. Each segment of the plurality of segments is representative of vehicle attribute data, wherein a fully populated specialty vehicle data identifier may correspond to a unique vehicle. The system further includes a memory including vehicle information; a user interface module; and one or more processors coupled to the memory and the user interface module, wherein the one or more processors are configured to: receive a request of the memory for vehicle attribute data based on a search term, the vehicle attribute data associated with one or more segments of the specialty vehicle data identifier template; identify specialty vehicle data identifiers stored in the memory including vehicle attribute data that substantially matches at least a portion the search term; compile an output including any identified specialty vehicle data identifier; and provide the output in an accessible format in response to the request for information.

A third example aspect of the invention is directed to a tangible non-transitory computer-readable medium having instructions stored thereon for facilitating vehicle insurance services provided by a casualty insurance provider. The instructions, when executed by one or more processors of a computer system, cause the one or more processors to: receive a search term request of vehicle attribute data stored on a memory; identify specialty vehicle data identifiers stored in the memory including vehicle attribute data that substantially matches at least a portion the search term request; compile an output including any identified specialty vehicle data identifier; and provide the output in an accessible format in response to the request for information.

These aspects and embodiments address known gaps within the technical field of providing vehicle insurance services, such as the logistical delays and costs associated with utilizing a vast amount of vehicle data. In particular, the technology described herein utilizes a memory structure that facilitates the flow and transformation of data used in providing vehicle insurance services. For example, a specialty vehicle data identifier facilitates convenient access to vehicle data related to a specific vehicle and/or general vehicle-type, such as historical collision data, vehicle build data, vehicle repair history, vehicle owner data, policyholder data, etc. The specialty vehicle data identifier is able to link stored vehicle data, which may eliminate or reduce redundant storage locations. The reduced storage locations may improve the flow and transformation of data and thereby improve the processing efficiency of providing vehicle insurance services related to vehicle repair, insurance rating, underwriting, marketing, actuarial review, vehicle research, etc.

The functionalities provided by these various aspects and embodiments are attained through the benefit of a computer network, wherein the user is better able to use and understand the vast amount of vehicle related data.

BRIEF DESCRIPTION OF THE DRAWINGS

The figures described below depict various aspects of the systems and methods disclosed herein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

DETAILED DESCRIPTION

Vehicle-related information is stored and maintained in a memory, e.g., memory device, for use by a casualty insurance provider. The memory incorporates a specialty vehicle data identifier (VDI) for identifying a vehicle. The VDI includes a plurality of segments corresponding to vehicle attributes associated with an individual vehicle and/or a type, group, or classification of vehicle and facilitates the storing of vehicle information within the memory as well as the accessing of vehicle information stored within the memory.

Figure 1:
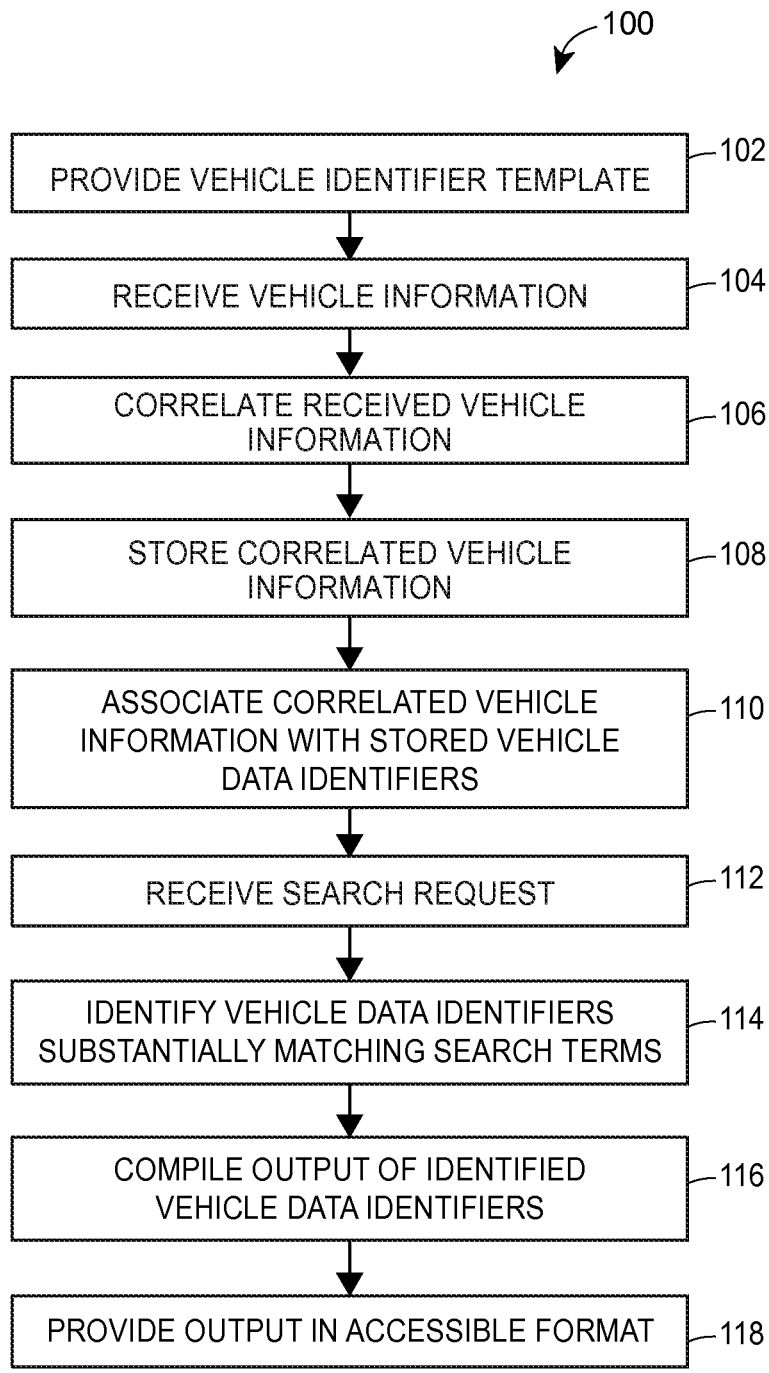
FIG. 1 depicts a general overview of a method to facilitate providing vehicle insurance services.

FIG. 1 is a flow diagram 100 of a method for facilitating vehicle insurance services provided by a casualty insurance provider. The method and/or portions thereof are capable of being stored within one or more memory devices and/or modules and executed by one or more processors of a computer system. The method includes providing a specialty vehicle data identifier template (block 102) for facilitating translation of a specialty vehicle data identifier (VDI) used to identify a vehicle. The specialty vehicle data identifier includes a plurality of segments, wherein each segment of the plurality of segments may be representative of a vehicle attribute. The vehicle attribute may include any type of information that a user may find useful in providing vehicle insurance services. The vehicle attribute may include general information corresponding to a group or type of vehicle, e.g., make, model, trim level, class, etc.; and/or may include specific information that corresponds to a particular vehicle. In some instances, a general vehicle attribute may be attained from public resources, such as books, internet, news media, etc. A specific vehicle attribute may include information that may not be readily available to the public, and which may be attained from private sources such as vehicle manufacturers, vehicle insurance companies, vehicle owners, and/or vehicle testing entities. Some examples of vehicle information that may pertain to a vehicle attribute include, and are not limited to: crash information of a particular vehicle, collision history of a particular vehicle type; vehicle occupant injury history of a particular vehicle type; litigation history of a particular vehicle type; original equipment manufacturer (OEM) data of a particular vehicle type; OEM recalls and product liability of a particular vehicle type; vehicle telematics information of a particular vehicle type; technical service bulletins of a particular vehicle type; semi-autonomous system claims handling of a particular vehicle type; weather conditions associated with a loss related to a particular vehicle type; treatment (e.g., repair and/or salvage) routing of a particular vehicle type; rental subrogation of a particular vehicle type; sales/leases of a particular vehicle type; maintenance records and/or history of a particular vehicle type; vehicle registrations of a particular vehicle; vehicle serial numbers; vehicle owner information, vehicle photos.

Vehicle information is received (block 104) by or provided to the one or more processors. The received vehicle information may be provided by or accessed from any type of information resource and pertain to one or more vehicle attributes represented within the VDI. The received vehicle information is correlated with one or more segments of the vehicle data identifier template (block 106) and stored in a memory (block 108). The stored correlated vehicle information is associated with one or more vehicle data identifiers within the memory (block 110). At this time, each associated vehicle data identifier may be considered discrete although each associated vehicle data identifier may or may not correspond to a physical vehicle, but rather pertain to a symbolic vehicle. That is, if one of the plurality of segments of a vehicle data identifier lack vehicle attribute information (e.g., serial number), the vehicle data identifier is considered incomplete and not fully populated. An incomplete vehicle data identifier may then be associated with or representative of more than one vehicle. For example, if a vehicle attribute associated with a vehicle serial number is not populated, the incomplete vehicle data identifier may be representative of a group, type, or class of vehicle. Otherwise, if each segment of a vehicle data identifier includes vehicle attribute information, the vehicle data identifier is considered complete, fully populated, and may therefore be representative of a specific, unique vehicle.

A request for information contained within the memory is received by the system (block 112). The request may be generated by a user at a user interface communicatively coupled to the system and utilizing one or more search terms. Each specialty vehicle data identifier stored in the memory may include and/or be associated with vehicle information that may include one or more vehicle attributes. Any specialty vehicle data identifier that includes or is associated with vehicle information that substantially matches at least a portion of the one or more search terms is identified (block 114). An output is compiled and includes any identified specialty vehicle data identifier (block 116). The output is provided and made available in an accessible format (block 118), for example, hard copy, electronic file stored on a memory device, a webpage or website on the internet, etc. The output, which includes vehicle information attained from the memory that relates to the search term(s), may be useful for a variety of purposes, including, and not limited to: vehicle insurance claims processing, vehicle underwriting, business marketing, customer/consumer services, risk assessment (actuarial science), vehicle research, etc. For example, the memory of vehicle data information may be searched to identify historical collision information associated with a particular type of vehicle. Any specialty vehicle data identifier stored within the memory that substantially matches the search term(s) will be identified. A vehicle insurance provider may evaluate the output or results of the search by examining the vehicle information represented by the specialty vehicle data identifier to, for example, categorize levels for treating a damaged vehicle based on crash information, determine insurance policy rating levels for the related type of vehicle, compile a product and or service for a vehicle owner.

In another example aspect, a vehicle insurance provider may become aware of a vehicle manufacturer's recall notice relating to a particular make, model, and/or type of vehicle. Utilizing the vehicle attribute(s) associated with the recall notice, the vehicle insurer may search the memory to identify any specialty vehicle data identifiers stored therein that are associated with vehicles affected by the recall notice. Any specialty vehicle data identifier within the memory that substantially matches the search term(s) will be identified and may be compiled into an output. The output may be evaluated and if any identified matching specialty vehicle data identifier includes a vehicle attribute that includes vehicle owner information, the vehicle insurance provider may then alert the associated vehicle owner of any identified vehicle affected by the recall notice. The alert provided by the vehicle insurance provider may be a mailed letter, an e-mail, a phone call, and/or a text message, which may contact the vehicle owner well in advance of notices that may be sent from the affected vehicle's manufacturer.

In another example aspect, a vehicle insurance provider may become aware of crash information of a particular vehicle involved in a crash. The crash information may be attained from telematics devices and/or sensors coupled to the vehicle involved in the crash. The crash information may be transmitted to a database including a collision history of the particular vehicle type that includes the vehicle involved in the crash. Utilizing the vehicle attribute(s) associated with the crash information and/or vehicle type, a vehicle insurer may update in real time the collision history in the memory, wherein future requests of information related to vehicle type will take into account such updated information.

In a further example aspect, a vehicle insurance provider may want to provide new product information to an owner of a particular type of vehicle. The memory of vehicle data information may be searched to identify any specialty vehicle data identifiers associated with the particular type of vehicle. Any specialty vehicle data identifier within the memory that substantially matches the search term(s) will be identified and included in the output. The output may be evaluated and if any identified matching specialty vehicle data identifier includes a vehicle attribute that includes vehicle owner information, information pertaining to insurance policy products and/or services, e.g., new and/or revised products, software updates; may then be sent to the owner of each vehicle associated with the identified specialty vehicle data identifier. The information provided by the vehicle insurance provider may be provided via a mailed letter; an e-mail; a phone call; an internet posting via a website and/or an individual or group text message via social media, such as a "tweet," social community page posting, etc.

Figure 2:
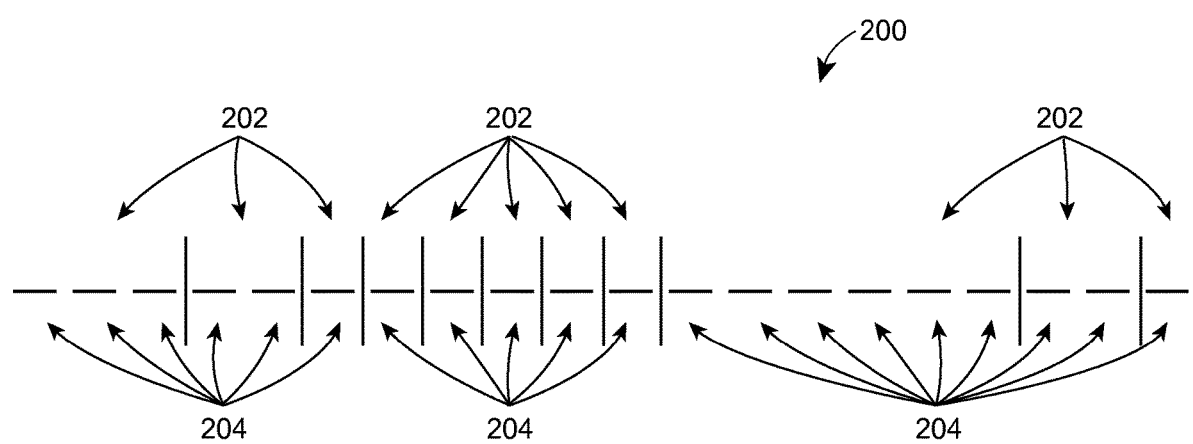
FIG. 2 depicts an example vehicle data identifier template including a plurality of segments, each segment capable of including alphanumeric and non-alphanumeric characters representative of a vehicle attribute.

FIG. 2 depicts an example embodiment of the specialty vehicle data identifier template 200 for a specialty vehicle data identifier. The specialty vehicle data identifier template 200 includes a plurality of segments 202, wherein each one of the plurality of segments includes one or more characters 204. Some or all segments 202 of the specialty vehicle data identifier 200 may correspond to or be associated with at least one vehicle attribute, wherein the character and/or characters 204 within the segment equate to a code pertaining to a particular vehicle attribute. The vehicle attribute that may be included or represented within the segment 202 of the specialty vehicle data identifier template and/or specialty vehicle data identifier may relate to and or be representative of information, which may include any type of specific information associated with a particular or specific, e.g., unique, individual vehicle; and/or general information associated with a group, type, or classification of vehicle.

A user may configure the specialty vehicle data identifier template 200 to include one or more segments 202 of vehicle attributes associated with any desired type or category of information that the user may find useful. General information primarily pertains to information generally associated with a type, classification, or group of vehicle, for example, general collision data (e.g., statistics) associated with a particular vehicle type, e.g., make, model, and/or trim level. Specific information primarily pertains to information specifically associated with a specific vehicle, for example, vehicle owner information, specific collision history data of that particular vehicle, policyholder information associated with that specific vehicle, repair history of that specific vehicle, a vehicle serial number, etc.

Although specific information may typically be associated with one particular vehicle, e.g., vehicle owner information, specific and general information may overlap and either type of information may or may not be exclusively associated with a unique vehicle or a group of vehicles. Additional example vehicle attributes that may be represented, e.g., by code, within one or more segments of the specialty vehicle data identifier and/or associated with one or more segments of a specialty vehicle data identifier template, may include information related to the vehicle, including, and not limited to: vehicle insurer, vehicle-type collision history; vehicle manufacturer information (e.g., year built and location built); vehicle type, e.g., make, model, and/or trim level; vehicle body style; vehicle engine type; vehicle safety equipment; vehicle and/or vehicle equipment recall alerts; vehicle defect investigations, notices, reports, complaints, and/or service bulletins; recommended vehicle repair and/or salvage procedures and costs; vehicle part warranties, costs, and market value estimations of the vehicle and/or vehicle parts, government regulations; vehicle maintenance records; vehicle operating information (e.g., event data recorder information, vehicle telematics device, and/or sensor information that may be attained in real time); vehicle marketing information; vehicle actuarial information; vehicle consumer information; vehicle insurance rating information; vehicle underwriting information; insurance policyholder information; and vehicle insurance claims information. The specialty vehicle data identifier and/or specialty vehicle data identifier template may also include a segment associated with a vehicle identification number (VIN). The VIN is a unique code used by the automotive industry to identify individual motor vehicles, towed vehicles, motorcycles, scooters, and mopeds as defined in International Organization for Standardization (ISO) 3833. The VIN, which is essentially a vehicle manufacturer's coded serial number for a vehicle, has been adopted by many countries including the European Union and the United States.

Alphanumeric and non-alphanumeric characters 204 may be used, e.g., code, within the plurality of segments 202 to represent one or more vehicle attributes. The alphanumeric and non-alphanumeric characters 204 may be a consistent representation of a vehicle attribute within a particular segment 202. Alternatively, the alphanumeric and non-alphanumeric characters 204 may be a variable representation of a vehicle attribute within a particular segment 202. In other words, a particular single or set of alphanumeric and/or non-alphanumeric characters 204 in a particular segment 202 may be representative of vehicle information for a particular vehicle manufacturer or a particular vehicle type or may pertain to a particular year of manufacture, while the same particular single or set of alphanumeric and/or non-alphanumeric characters 204 in the same particular segment 202 of another specialty vehicle data identifier may be representative of different vehicle information for a different vehicle manufacturer or a different vehicle type or a different year of manufacture. For example, two specialty vehicle data identifiers may each include "E/1e3" within a particular segment representing a vehicle attribute. However, if each of the two specialty vehicle data identifiers in this example is associated with a different vehicle manufacturer, "E/1e3" may pertain to a two-door body type for one vehicle data identifier and "E/1e3" may pertain to a four-door body type for the other specialty vehicle data identifier. Additionally, the same vehicle attribute may be represented by a different one or set of alphanumeric and/or non-alphanumeric characters. For example, "@9ab2" may pertain to a type of body style, e.g., coupe, for a specialty vehicle data identifier associated with one vehicle manufacturer, and "MK-3" may pertain to the same coupe body style for a specialty vehicle data identifier associated with another different vehicle manufacturer.

Figure 3:
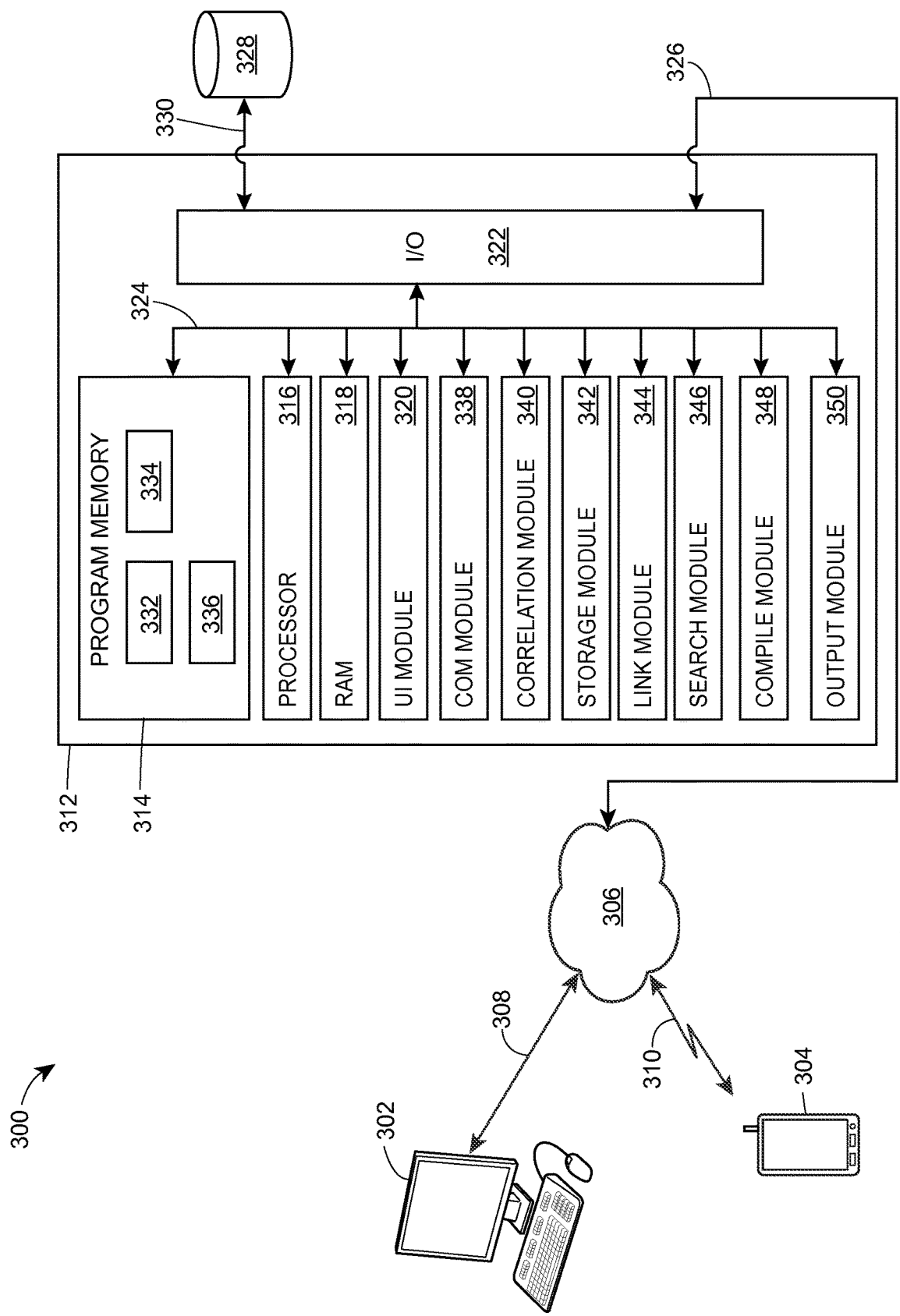
FIG. 3 depicts a block diagram of an example computing system configured to facilitate providing vehicle insurance services in accordance with the embodiments described herein.

FIG. 3 illustrates a block diagram of an example computer system 300 capable of being incorporated with the methods described herein. The high-level architecture of the computer system 300 includes both hardware and software modules or applications, as well as various data communications channels for communicating data between the various hardware and software components. The computer system 300 may include one or more computing devices, such as a stationary computing device 302 (e.g., desktop computer) or a mobile computing device 304 (e.g., laptop computer, tablet, smartphone). The stationary computing device 302 may be a general-use desktop computer capable of performing the functions relating to or dedicated to facilitate providing insurance services described herein. The mobile computing device 304 may be a general-use mobile personal computer, cellular phone, smartphone, tablet computer, wearable computer (e.g., a watch, glasses, etc.), or a device dedicated to facilitate providing insurance services described herein. Further, the mobile computing device may be a thin-client device that outsources some or most processing to the server device 312. Each computing device 302, 304 may include one or more processors, memory devices, and/or user interfaces and be operatively connected to a communication network 306. It will be appreciated that functions performed by either the stationary computing device 302 or the mobile computing device 304 may also be performed by the cooperation of the stationary computing device 302 and the mobile computing device 304.

The computing devices 302, 304 are capable of communicating with one another directly over a wired 308 and/or wireless 310 link(s). In addition, each computing device 302, 304 may communicate with the network 306 over their respective wired 308 and/or wireless 310 links. The communication network 306 may be a proprietary network, a secure public internet, a virtual private network, or some other type of network, such as dedicated access lines, plain ordinary telephone lines, satellite links, etc., or any combination thereof. Where the network 306 includes the internet, data communications may take place over the network 306 via an internet communication protocol.

The computer system 300 also includes a server computing device 312. The server device 312 includes several operatively coupled components, including, and not limited to: a program memory 314, a processor 316 (e.g., a microprocessor or a microcontroller), a memory device 318 (e.g., random-access memory (RAM)), a user interface module 320, and input/output (I/O) circuitry 322; all of which may be operatively interconnected via a communication address/data bus 324. The user interface module 320 facilitates user interactions with the server device 312 and may include a display monitor, keyboard, mouse device, microphone, speaker, etc. The server device 312 may also be operatively connected to the network 306 via a network communication link 326, which may be a wired and/or wireless connection to the network 306. In addition, a database 328 external to the servicer device 312 may be operatively connected to and accessible from the server device 312 via another communication link 330. The database 328 may also be communicatively connected to the network 306 and accessible by the computing devices 302, 304.

The program memory 314 includes an operating system 332 that may include one or more operating platforms, a data storage device 334, and a plurality of software modules, applications, and/or routines 336. The program memory 314 may be configured to store computer-readable instructions that when executed by the one or more processors 316 cause the server device 312 to implement the methods described herein.

The data storage 334 and/or the software modules 336 may include instructions that when executed by the processor 316, cause a server application and/or a web server to execute various software modules and/or applications and/or routines of the method(s) described herein for facilitating vehicle insurance services. The software modules 336 may include programs and/or instructions (e.g., routines) that may separately or collectively be executed by the processor 316. Some example modules may include, at least: a communication module utilizing any suitable wired or wireless communication protocol, such as wireless telephony network (e.g., GSM, CDMA, LTE, etc.), a Wi-Fi network (802.11 standards), a WiMAX network, a Bluetooth network, etc., to facilitate communication with the server device 312; a correlation module facilitating correlation of vehicle information with one or more segments of a vehicle data identifier; a storage module facilitating storage of the correlated vehicle information into a memory such as the database 328; a link module facilitating association of the correlated one or more segments of the received vehicle information with one or more discrete vehicle data identifiers stored in memory, e.g., storage module and/or database 328; a search module facilitating identification of each discrete vehicle data identifier stored in the storage module or the database 328 that includes vehicle information that substantially matches at least a portion of the search term; a compiler module facilitating compilation of any identified discrete vehicle data identifier into an output; and an output module for providing the output in an accessible format, such as file saved in a memory device or displayed on a screen.

While the communication module, correlation module, storage module, link module, search module, compiler module, and output module described above may be configured and/or embodied in software and/or firmware, it is to be understood that any combination of these modules may be configured and/or embodied in software/firmware and/or hardware. For example, at least a portion of the communication module may be integrated in a hardware communication module 338; at least a portion of the correlation module may be integrated in a hardware correlation module 340; at least a portion of the link module may be integrated in a hardware link module 342; at least a portion of the search module may be integrated in a hardware search module 344; at least a portion of the compiler module may be integrated in a hardware compiler module 346; and at least a portion of the output module may be integrated in a hardware output module 348. One or more of these hardware modules 340, 342, 344, 346, 348 may be operatively coupled to the program memory 314, processor 316, memory device 318, user interface 320, and I/O circuit 322 via the communication bus 324.

The program memory device 314 and/or database 328 may also be adapted to store data related to vehicle attributes, vehicle data identifiers, and/or vehicle data identifier templates. The data may include, for example, information collected or gathered by the server device 312. The data may also be collected or gathered by the computing devices 302, 304 and uploaded to the server device 312. For example, data received by an event data recorder (EDR) and/or sensors operatively coupled to the vehicle may be transmitted to the computing devices 302, 304 and/or server device 312. The computing devices 302, 304 and/or server device 312 may access or store data at the memory device 318, data storage 334, and/or the database 328.

Although only one processor 316 is shown in the server device 312, it is to be understood that multiple processors and/or microprocessors may be included. Similarly, the server computing device 312 may include multiple RAMs and multiple program memories. The RAM(s) and program memories may be implemented as semiconductor memories, magnetically readable memories, and/or optically readable memories, for example. In addition, the I/O circuitry 322 shown as a single block may include a number of different types of I/O circuits.

The server device 312 may perform the various processing functions described herein in conjunction with the one or more computing devices 302, 304 or the various functions may be performed solely by the server device 312. Similarly, the one or more computing devices 302, 304 may perform the various processing functions described herein in conjunction with the server device 312 or the various functions may be performed solely by the one or more computing devices 302, 304. Furthermore, the processing functions performed by server device 312 may be distributed among a plurality of server devices configured in an arrangement known as "cloud computing." This arrangement may provide several advantages, such as, for example, enabling near real-time uploads and downloads of information as well as periodic uploads and downloads of information. This arrangement may provide for a thin-client embodiment of the mobile computing device 304 and/or stationary computing device 302 described herein as well as a primary backup of some or all of the data gathered by the server computing device 312.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations). A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still cooperate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

Of course, the applications and benefits of the systems, methods, and techniques described herein are not limited to only the above examples. Many other applications and benefits are possible by using the systems, methods, and techniques described herein.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

Moreover, although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims. By way of example, and not limitation, the disclosure herein contemplates at least the following aspects:

Aspect 1: A method implemented with a computer system for facilitating vehicle insurance services provided by a casualty insurance provider, the method comprising providing a specialty vehicle data identifier template for facilitating translation of a specialty vehicle data identifier used to identify a vehicle, the specialty vehicle data identifier template including a plurality of segments, each segment of the plurality of segments representative of a vehicle attribute, wherein a fully populated vehicle data identifier may correspond to a unique vehicle; receiving, by one or more processors of the computer system, a request of a memory for vehicle attribute data based on a search term, the vehicle attribute data associated with one or more segments of the specialty vehicle data identifier template; identifying, by the one or more processors, each specialty vehicle data identifier stored in the memory including vehicle attribute data that substantially matches at least a portion the search term; compiling, by the one or more processors, an output including any identified specialty vehicle data identifier; and providing, by the one or more processors, the output in an accessible format in response to the request for information.

Aspect 2: The method of aspect 1, further comprising receiving, by the one or more processors, vehicle information; correlating, by the one or more processors, the received vehicle information with one or more segments of the plurality of segments of the specialty vehicle data identifier template; and storing, by the one or more processors, the correlated received vehicle information in the memory.

Aspect 3: The method of any one of aspects 1 and 2, wherein receiving vehicle information includes receiving vehicle information from a generally public source.

Aspect 4: The method of any one of aspects 1-3, wherein receiving vehicle information includes receiving vehicle information from a generally non-public source.

Aspect 5: The method of any one of aspects 1-4 wherein providing the output in an accessible format includes identifying a vehicle owner associated with one of the identified specialty vehicle data identifiers.

Aspect 6: The method of any one of aspects 1-5, further comprising providing information including at least a portion of the output to the identified vehicle owner.

Aspect 7: The method of any one of aspects 1-6, wherein providing information including at least a portion of the output to the identified vehicle owner comprises sending an electronic message to the identified vehicle owner or group of identified vehicle owners.

Aspect 8: The method of any one of aspects 1-7, further comprising evaluating the output and identifying a vehicle owner associated with one of the identified specialty vehicle data identifiers substantially matching at least a portion of the search term.

Aspect 9: The method of any one of aspects 1-8, further comprising advising the identified vehicle owner of an insurance rating based on the evaluated output.

Aspect 10: The method of any one of aspects 1-9, further comprising advising the identified vehicle owner of a vehicle product and/or a vehicle service based on the evaluated output.

Aspect 11: The method of any one of aspects 1-10, further comprising advising the identified vehicle owner of a vehicle alert notice based on the evaluated output.

Aspect 12: A system for facilitating vehicle insurance services provided by a casualty insurance provider, the system comprising a specialty vehicle data identifier template for facilitating translation of a vehicle data identifier used to identify a vehicle, the specialty vehicle data identifier template including a plurality of segments, each segment of the plurality of segments representative of vehicle attribute data, wherein a fully populated specialty vehicle data identifier may correspond to a unique vehicle; a memory including vehicle information; a user interface module; and one or more processors coupled to the memory and the user interface module, the one or more processors configured to: receive a request of the memory for vehicle attribute data based on a search term, the vehicle attribute data associated with one or more segments of the specialty vehicle data identifier template; identify specialty vehicle data identifiers stored in the memory including vehicle attribute data that substantially matches at least a portion the search term; compile an output including any identified specialty vehicle data identifier; and provide the output in an accessible format in response to the request for information.

Aspect 13: The system of aspect 12, wherein a fully populated specialty vehicle data identifier corresponds to a unique vehicle and wherein a partially populated specialty vehicle data identifier corresponds to a group of vehicles having at least one vehicle attribute in common.

Aspect 14: A tangible non-transitory computer-readable medium having instructions stored thereon for facilitating vehicle insurance services provided by a casualty insurance provider of a vehicle damaged in a crash, the instructions, when executed by one or more processors of a computer system, cause the one or more processors to: receive a search term request of the memory for vehicle attribute data, the vehicle attribute data associated with one or more segments of a specialty vehicle data identifier template used for facilitating translation of a specialty vehicle data identifier; identify specialty vehicle data identifiers stored in the memory including vehicle attribute data that substantially matches at least a portion the search term request; compile an output including any identified specialty vehicle data identifier; and provide the output in an accessible format in response to the search term request.

What is claimed:

1. A computer-implemented method implemented with a computer system for facilitating vehicle insurance services provided by a casualty insurance provider, the method comprising:
    providing a specialty vehicle data identifier template including a plurality of segments, each segment of the plurality of segments capable of including a code representative of a vehicle attribute;
    receiving, by one or more processors via a sensor coupled to a damaged vehicle, crash information associated with the damaged vehicle at or near the time of a crash;
    automatically correlating, by the one or more processors, the received crash information with one or more segments of the specialty vehicle data identifier template representative of historical collision information of a vehicle type that includes the damaged vehicle;
    utilizing a specialty vehicle data identifier of the damaged vehicle and automatically storing, proximate the crash by the one or more processors, the correlated crash information in a memory;
    automatically associating, by the one or more processors, the stored correlated crash information with one or more discrete vehicle data identifiers stored in the memory and including one or more segments representative of the vehicle type of the damaged vehicle;
    receiving, via a user interface coupled to the one or more processors of the computer system, a request for information stored in the memory based upon a search term including the code representative of the vehicle attribute;
    identifying, by the one or more processors, each specialty vehicle data identifier stored in the memory including the code that substantially matches at least a portion of the search term;
    compiling, by the one or more processors, an output including any identified specialty vehicle data identifier; and
    providing, via the user interface, the output in response to the request for information.

2. The computer-implemented method of claim 1, wherein the crash information includes vehicle information from a generally public source.

3. The computer-implemented method of claim 1, wherein the crash information includes vehicle information from a generally non-public source.

4. The computer-implemented method of claim 1, further comprising identifying a vehicle owner associated with one of the identified specialty vehicle data identifiers of the damaged vehicle.

5. The computer-implemented method of claim 4, further comprising:
    providing information including at least a portion of the output to the identified vehicle owner.

6. The computer-implemented method of claim 5, wherein providing information including at least a portion of the output to the identified vehicle owner comprises:
    sending an electronic message to the identified vehicle owner or group of identified vehicle owners.

7. The computer-implemented method of claim 1, further comprising:
    evaluating the output and identifying a vehicle owner associated with one of the identified specialty vehicle data identifiers substantially matching at least a portion of the search term.

8. The computer-implemented method of claim 7, further comprising:
    advising the identified vehicle owner of an insurance rating based upon the evaluated output.

9. The computer-implemented method of claim 1, further comprising:
    evaluating the output and identifying a vehicle owner associated with one of the identified specialty vehicle data identifiers substantially matching at least a portion the search term; and
    advising the identified vehicle owner of a vehicle product and/or a vehicle service based upon the evaluated output.

10. The computer-implemented method of claim 1, further comprising:
    evaluating the output and identifying a vehicle owner associated with one of the identified specialty vehicle data identifiers substantially matching at least a portion of the search term; and
    advising the identified vehicle owner of a vehicle alert notice based upon the evaluated output.

11. The computer-implemented method of claim 1, wherein the vehicle attribute of at least one segment is associated with historical collision information.

12. A computer system for facilitating vehicle insurance services provided by a casualty insurance provider, the system comprising:
    a specialty vehicle data identifier template including a plurality of segments, each segment of the plurality of segments capable of including a code representative of a vehicle attribute;
    a memory including vehicle information associated with one or more segments of the specialty vehicle data identifier template;
    a user interface module; and
    one or more processors coupled to the memory and the user interface module, the one or more processors configured to:
    receive, via a sensor operably coupled to the damaged vehicle, crash information associated with the damaged vehicle at or near the time of a crash;
    automatically correlate the received crash information with one or more segments of the specialty vehicle data identifier template representative of historical collision information of a vehicle type that includes the damaged vehicle;
    utilize a specialty vehicle data identifier of the damaged vehicle to automatically store, proximate the crash, the correlated crash information in the memory;
    automatically associate the stored correlated crash information with one or more discrete vehicle data identifiers stored in the memory and including one or more segments representative of the vehicle type of the damaged vehicle;
    receive, via a user interface coupled to the one or more processors, a request for information stored in the memory based upon a search term including the code representative of the vehicle attribute;
    identify each specialty vehicle data identifier stored in the memory including the code that substantially matches at least a portion of the search term;
    compile an output including any identified specialty vehicle data identifiers; and
    provide, via the user interface, the output in response to the request for vehicle information.

13. The computer system of claim 12, wherein a fully populated specialty vehicle data identifier corresponds to a unique vehicle.

14. The computer system of claim 12, wherein a partially populated specialty vehicle data identifier corresponds to a group of vehicles having at least one vehicle attribute in common.

15. The computer system of claim 12, wherein the one or more processors are configured to evaluate the output and advise an identified vehicle owner of an insurance rating based upon the evaluated output.

16. The computer system of claim 12, wherein the one or more processors are further configured to evaluate the output and advise an identified vehicle owner of a vehicle product and/or a vehicle service based upon the evaluated output.

17. The computer system of claim 12, wherein one or more processors are further configured to evaluate the output and advise an identified vehicle owner of a vehicle alert notice based upon the evaluated output.

18. A tangible non-transitory computer-readable medium having instructions stored in a memory of a computer system for facilitating vehicle insurance services provided by a casualty insurance provider, the computer system including a specialty vehicle data identifier template including a plurality of segments, each segment of the plurality of segments capable of including a code representative of a vehicle attribute, and wherein the instructions, when executed by one or more processors of the computer system, cause the one or more processors to:

receive, via a sensor coupled to a damaged vehicle, crash information associated with the damaged vehicle at or near the time of a crash;

automatically correlate the received crash information with one or more segments of the specialty vehicle data identifier template representative of historical collision information of a vehicle type that includes the damaged vehicle;

utilize a specialty vehicle data identifier of the damaged vehicle to automatically store, proximate the crash, the correlated crash information in the memory;

automatically associate the stored correlated crash information with one or more discrete vehicle data identifiers stored in the memory and including one or more segments representative of the vehicle type of the damaged vehicle;

receive, via a user interface, a request for information stored in the memory based upon a search term including the code representative of the vehicle attribute;

identify each specialty vehicle data identifier stored in the memory including the code that substantially matches at least a portion of the search term;

compile an output including any identified specialty vehicle data identifier; and provide, via the user interface, the output in response to the request for vehicle information.

* * * * *